H. GOSSTROM.
PRESSURE GAGE AND TIRE VALVE.
APPLICATION FILED NOV. 23, 1917.

1,357,286. Patented Nov. 2, 1920.
2 SHEETS—SHEET 1.

H. GOSSTROM.
PRESSURE GAGE AND TIRE VALVE.
APPLICATION FILED NOV. 23, 1917.
1,357,286.
Patented Nov. 2, 1920.
2 SHEETS—SHEET 2.
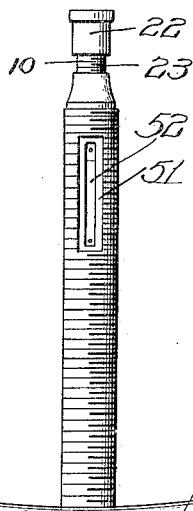
Fig.3.
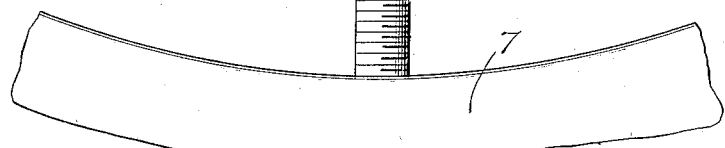
Fig.4.
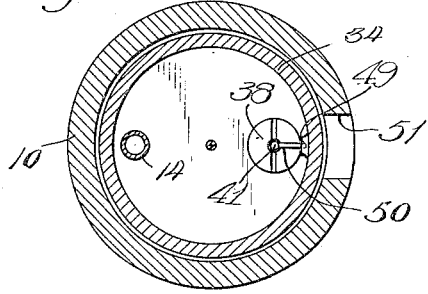
Fig.5.
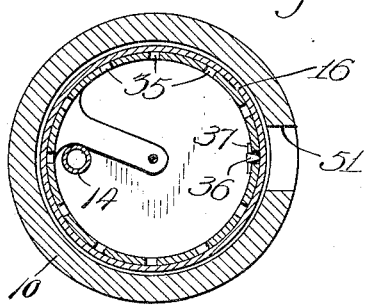
Fig.6.
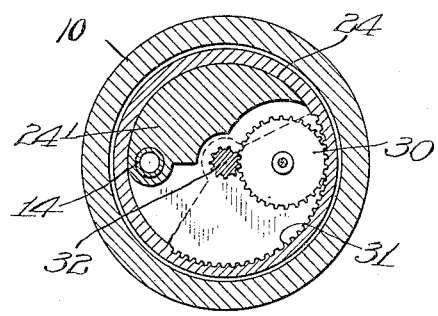
Fig.7.
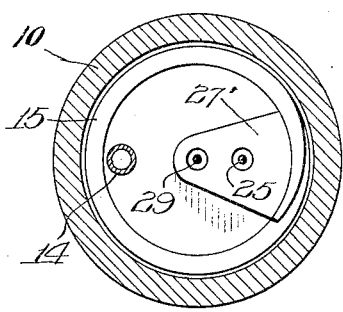
Witness:
H. Barrett
Inventor:
Hugo Gosstrom
by Jones Addington Ames & Seibold
Attys.

UNITED STATES PATENT OFFICE.

HUGO GOSSTROM, OF CHICAGO, ILLINOIS, ASSIGNOR OF ONE-TWELFTH TO HERMAN GOSSTROM, ONE-EIGHTEENTH TO JOHN E. GOSSTROM, ONE-EIGHTEENTH TO SELMA GOSSTROM, AND ONE-EIGHTEENTH TO EDITH GOSSTROM.

PRESSURE-GAGE AND TIRE-VALVE.

1,357,286.      Specification of Letters Patent.      Patented Nov. 2, 1920.

Application filed November 23, 1917. Serial No. 203,492.

*To all whom it may concern:*

Be it known that I, HUGO GOSSTROM, a citizen of the United States, residing at Chicago, in the county of Cook and State of Illinois, have invented new and useful Improvements in Pressure-Gages and Tire-Valves, of which the following is a full, clear, concise, and exact description, reference being had to the accompanying drawing, forming a part of this specification.

My invention relates to improvements in a combined pressure gage and tire valve, and has for its object the production of a device by the use of which the pressure within the tire may be accurately registered while the tire is being filled, and having automatic means for preventing any excess of pressure within the tire.

A further object is the production of a device in which the pressure gage and the tire valve are combined in an economical and efficient manner.

A further object is the production of a device that can be cheaply manufactured, one that is not liable to disarrangement of parts, and one that can be readily attached and detached.

These and other objects as may hereafter appear, are attained by my device, an embodiment of which is illustrated in the accompanying drawings, in which—

Fig. 3 represents an elevation of my device in position;

Fig. 4 represents a sectional view on the line 4—4 of Fig. 2 looking in the direction indicated by the arrows;

Fig. 5 represents a sectional view on the line 5—5 of Fig. 2 looking in the direction indicated by the arrows;

Fig. 6 represents a sectional view on the line 6—6 of Fig. 2 looking in the direction indicated by the arrows;

Fig. 7 represents a sectional view on the line 7—7 of Fig. 2 looking in the direction indicated by the arrows.

Like numerals of reference indicate like parts in the several figures of the drawing.

Figure 1:
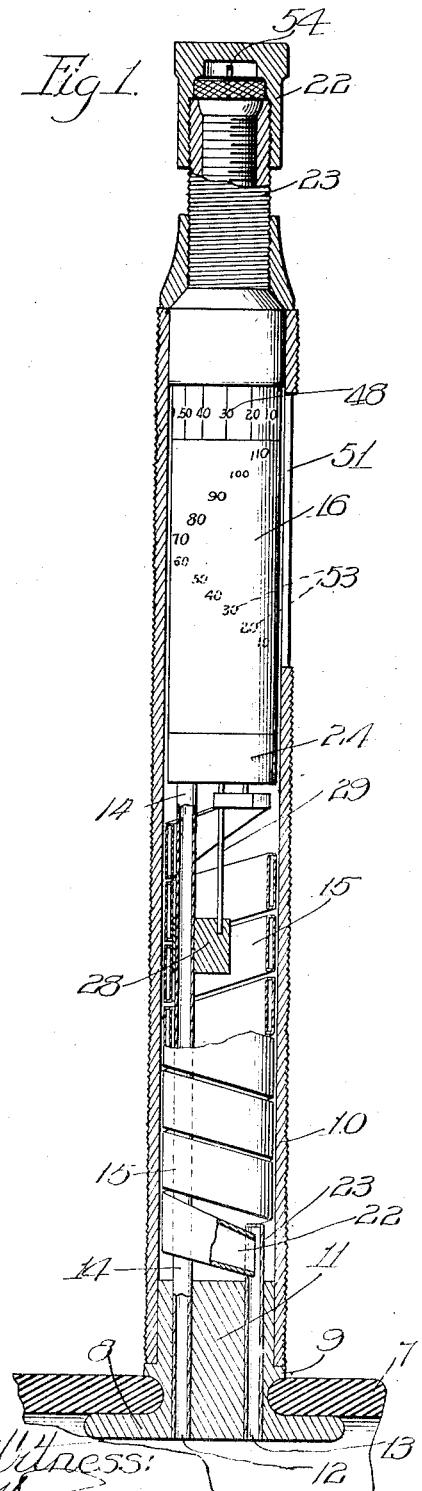
Figure 1 represents a sectional view of my device with parts broken away showing the interior.
Figure 2:
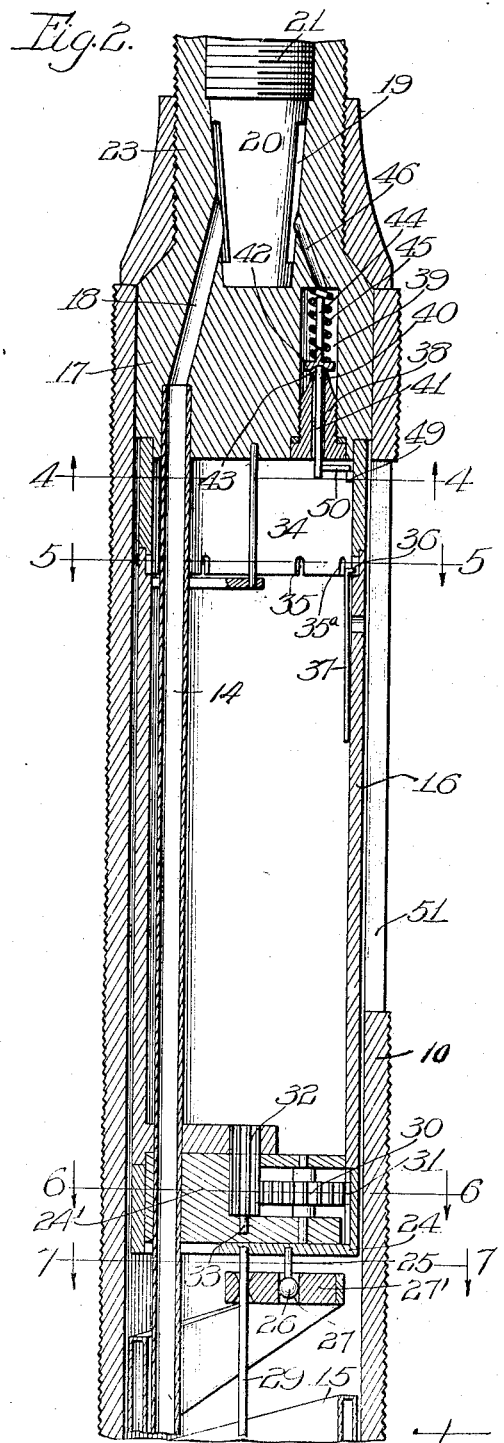
Fig. 2 represents an enlarged view of the upper portion of Fig. 1.

Referring now to the drawings, 7 represents the inner tube within which the foot 8 of my valve casing projects. This foot extends upward through the tube and has a shoulder 9, against which the upper portion of the tube abuts, this shoulder forming the outer shell of the device. The base 11 which terminates in the foot 8, is provided with openings 12 and 13, through the former of which the air is forced into the tire, and through the latter the air registers the pressure within the tube.

A tube 14 fits within the channel 12 in the base and extends upwardly through the air spring 15, the registering cylinder 16 and into the valve block 17, where it communicates with a channel 18 extending upwardly through the valve block and into the peripheral chamber 19 formed in the base 20 of the threaded plug 21, the screw cap 22 being screwed over the upper threaded portion 23 of the valve block 17. The lower end 22 of spring 15, preferably of silver, is secured in open communication with the upper end of tube $23^a$ fitting within the opening 13. This spring fits loosely within the chamber in the casing 10, and is closed at its upper end and secured to the bottom of a movable cylindrical casing fitting within the shell 10, the connection between the two being effected by means of a pin 25 fitting in the bottom of the member 24 and terminating at its lower end in a ball 26 fitting within a slot 27 in an upper spring block $27^1$. A supporting block 28 is rigidly mounted within the casing below the member 24. Rigidly mounted within the casing above the member 24 is a supporting block $24^1$, and the member 24 is pivotally mounted thereon by means of a pin support 29.

A ratchet pinion 30 is mounted within a recess in the member $24^1$, engaging with ratchet teeth 31 on the internal periphery of the member 24 and also engaging with the teeth of the pinion 32 on the shaft 33, this shaft being secured at its upper end to the registering member 16. It will thus be seen that as the member 24 is revolved through the pressure exerted against the block $27^1$, the registering member 16 is turned through the medium of the rack, pinion and gear, 30, 31, 32.

On top of the registering member 16 is mounted a regulating locking collar 34, provided with a plurality of recesses 35—35a, in its lower periphery adapted to receive the upper end 36 of a spring 37, secured to the inner periphery of the registering member the end slipping into the nearest recess as the member rotates. A threaded stem 38 passes into a channel 39 in the block 17, and is provided with a central bore 40 and a valve unseating rod 41 passing therethrough. Mounted within the chamber 39 is a valve 42 adapted to fit over the top of the valve seat 43 in the member 38. A valve stem 44 is mounted on the top of the valve 42 and a spring 45 surrounds the stem. The chamber 39 is in open communication with the peripheral channel 19 through a passage 46 in the block 17. The inner periphery of the member 34 is provided with a boss or cam projection 49, which is adapted to engage a pin 50 projecting outwardly from the bottom of the valve unseating rod 41.

It will be noted by reference to Fig. 4 that when the registering cylinder is revolved beyond a certain point, the pin 50 rides over the cam or boss 49, raising the valve unseating rod 41 and lifting up valve 42, permitting the escape of air from chamber 19.

The outer periphery of the member 34 has an indicating scale 48 to regulate the pressure at which the valve 42 shall be opened.

In the operation of my device when it is desired to inflate the tire, the cap 22 is removed, exposing the ordinary valve stem 54, which is unseated in the ordinary manner when the connection is made between the air pump and the stem, permitting the passage of air down through the channel 18 and the tube 14 into the tire. The regulating locking collar 34 having been adjusted so as to unseat the valve at any desired pressure, the excess pressure passes down through the passage 46, chamber 39 and passage 40 to the atmosphere.

As the tire is being filled and pressure increases, the cylinder 16 is revolved through the gear and pinion 30, 31, 32 heretofore described, until the maximum pressure is reached, at which point the pin 50 rides over the cam 49, unseating the valve 42 and permitting the air to vent to the atmosphere. This of course comes out with a hissing sound and serves to notify the operator that the desired pressure has been reached. The stem 21 is again screwed down in place and no more air passes out from the tire through the valve.

The outer cylinder 10 is cut away as shown at 51, forming a vertical opening 52, through which the pressure within the tire may be read, it being understood of course that numbers 53 are provided on the outer face of the cylinder 16, which numbers can be read through the opening 52.

Having thus described my invention, what I claim as new and desire to secure by Letters Patent is:

1. In a combination tire gage and pressure valve, an outer casing having a tube adapted to communicate with the interior of a tire, a hollow spring positioned within said casing adapted to be in communication with the interior of the tire, a registering cylinder loosely mounted within said casing and positioned above said tube and a valve controlled by the movement of said registering cylinder to permit the escape of air from said tube.

2. In a combination tire gage and pressure valve, an outer casing having a tube adapted to communicate with the interior of a tire, a hollow spring positioned within said casing adapted to be in communication with the interior of the tire, a registering cylinder loosely mounted within said casing and positioned above said tube, and a valve controlled by the movement of said registering cylinder to permit the escape of air from said tube, and hand controlled means for regulating the movement of said valve, whereby said valve may be unseated when predetermined pressure is reached.

3. In a combination tire gage and pressure valve, an outer casing having a tube adapted to communicate with the interior of a tire, a hollow spring adapted to be in communication with the interior of the tire, a registering cylinder pivotally mounted and operated by the movement of said spring, an adjusting member removably secured to said casing, a valve to permit the escape of air from said tire, a cam on the interior periphery of said adjusting member adapted to engage the stem of said valve and unseat same when a predetermined pressure is reached.

In witness whereof, I have hereunto subscribed my name.

HUGO GOSSTROM.